(12) United States Patent
Zhou

(10) Patent No.: US 8,572,301 B2
(45) Date of Patent: Oct. 29, 2013

(54) INTERFACE DEVICE FOR INPUT DEVICE

(75) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 89 days.

(21) Appl. No.: 13/274,365

(22) Filed: Oct. 17, 2011

(65) Prior Publication Data

US 2013/0042033 A1 Feb. 14, 2013

(30) Foreign Application Priority Data

Aug. 11, 2011 (CN) .......................... 2011 1 0229896

(51) Int. Cl.
*G06F 3/00* (2006.01)
*H05K 7/10* (2006.01)

(52) U.S. Cl.
USPC ........................................... 710/60; 710/302

(58) Field of Classification Search
None
See application file for complete search history.

(56) References Cited

U.S. PATENT DOCUMENTS

2009/0300252 A1* 12/2009 Liu et al. .................. 710/302
2011/0225414 A1* 9/2011 Zhou ........................ 713/100
2013/0036248 A1* 2/2013 Zhou ........................ 710/306

OTHER PUBLICATIONS

Universal Serial Bus Specification, Sep. 23, 1998, Compaq/Intel/Microsoft/NEC, Revision 1.1.*
Guidelines for Choosing RF and Microwave Products, 2009, Anatech Electronics, Inc.*

* cited by examiner

*Primary Examiner* — Hyun Nam
(74) *Attorney, Agent, or Firm* — Altis & Wispro Law Group, Inc.

(57) ABSTRACT

An interface device for input device includes a motherboard, a connector, a first video graphics array (VGA) interface electronically connected to motherboard, a second VGA interface electronically connected with the first VGA interface and a display. The connector is positioned on the display and electronically connected to the second VGA interface. The motherboard controls the connector via the first VGA interface and the second VGA interface to communicate with an input device mated with the connector.

7 Claims, 2 Drawing Sheets

INTERFACE DEVICE FOR INPUT DEVICE

BACKGROUND

1. Technical Field

The exemplary disclosure generally relates to interface devices, particularly to an interface device to be used for mating with mice or keyboards.

2. Description of Related Art

A mouse connector or a keyboard connector are typically positioned on a back board of a computer chassis. In use, the back board usually faces away from the users and it is inconvenient for users to plug a mouse or a keyboard into the corresponding mouse connector or corresponding keyboard connector.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary fan delay control circuit. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
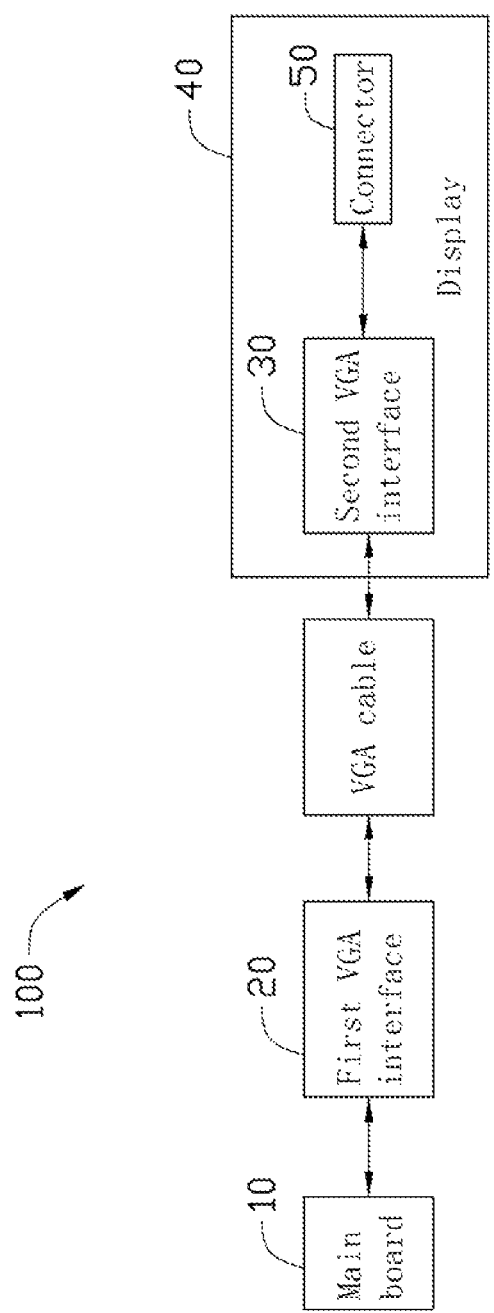
FIG. 1 shows a block diagram of an exemplary embodiment of an interface device for input device.

Referring to FIG. 1, an exemplary embodiment of an interface device for input device 100 includes a motherboard 10, a first video graphics array (VGA) interface 20 electronically connected to the motherboard 10, a VGA cable 90, a second VGA interface 30 positioned on a display 40 and electronically connecting with the first VGA interface 20 via a VGA cable, and a connector 50 positioned on the display 40 and electronically connected to the second VGA interface 30. The motherboard 10 outputs video signals to the display 40 via the first VGA interface 20 and the second VGA interface 30. The motherboard 10 communicates with a mouse or a keyboard mated with the connector 50 via the first VGA connector 20 and the second VGA connector 30.

Figure 2:
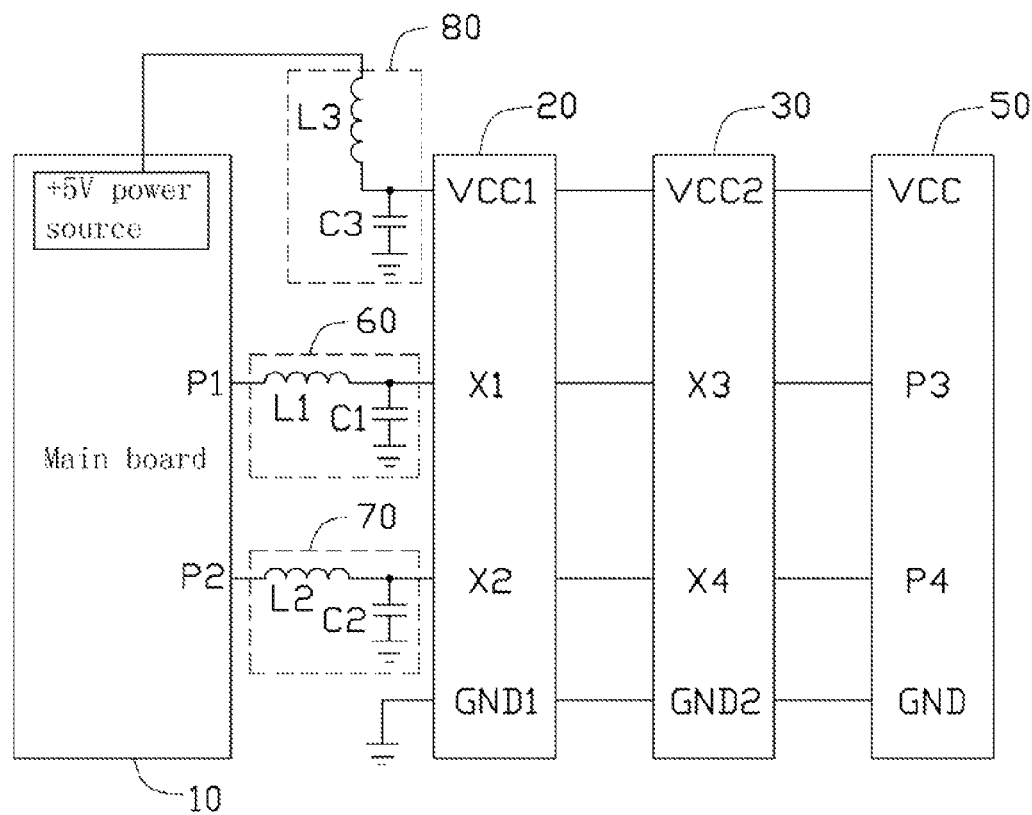
FIG. 2 is a schematic circuit diagram of an exemplary embodiment of the interface device for input device of FIG. 1.

The motherboard 10 is attached to a chassis of a host device (not shown). Referring to FIG. 2, the motherboard 10 includes a first control pin P1 and a second control pin P2.

The first VGA interface 20 and the second VGA interface 30 transmit video signals from the motherboard 10 to the display 40. The first VGA interface 20 is positioned on and is exposed from the chassis. The first VGA interface 20 has a standard VGA pinout configuration, and includes a first pin X1 electronically connected to the first control pinP1, a second pin X2 electronically connected to the second control pin P2, a power source pin VCC1 electrically connected to a power source, such as a +5V power source of the motherboard 10 and a ground pin GND 1 connected to ground. The second VGA interface 30 is positioned on and is exposed from the display 40. The second VGA interface 30 has a standard VGA pinout configuration, and includes a third pin X3, a fourth pin X4, a power source pin VCC2 and a ground pin GND2 electronically connected to the first pin X1, the second pin X2, the power source pin VCC1 and the ground pin GND1 respectively of the first VGA interface 20. In this embodiment, the pins of the first VGA interface 20 have substantially the same function as the corresponding pins of the second VGA interface 30.

In the standard VGA pinout configuration, Pin 9 of the VGA interface is a power source pin connected to a +5V DC power source, Pin 5 of the VGA interface is a ground pin connected to ground, Pin 4 and Pin 11 are reserved (not connected). In this embodiment, the power source pin VCC1 of the first VGA interface 20 and the power source pin VCC2 of the second VGA interface 30 are in correspondence with the Pin 9 of the VGA pinout configuration. The ground pin GND 1 of the first VGA interface 20 and the ground pin GND2 of the second VGA interface 30 are in correspondence with the Pin 5 of the VGA pinout configuration. The first pin X1 of the first VGA interface 20 and the third pin X3 of the second VGA interface 30 are in correspondence with the Pin 4 of the VGA pinout configuration. The third pin X2 of the first VGA interface 20 and the fourth pin X4 of the second VGA interface 30 are in correspondence with the Pin 11 of the VGA pinout configuration.

The connector 50 includes a first connecting pin P3, a second connecting pin P4, a power source pin VCC and a ground pin GND electronically connected to the third pin X3, the fourth pin X4, the power source pin VCC2 and the ground pin GND2 respectively of the second VGA interface 30 via the VGA cable 90. Thus, the connector 50 positioned on the display 40 communicates with the first control pin P1 and the second control pin P2 of the motherboard 10 via, the second VGA interface 30, the VGA cable 90 and the first VGA interface 20. The connector 50 further can be powered by the power source (e.g., a +5V power source) via the power source pin VCC2 of the second VGA interface 30, the VGA cable 90 and the power source pin VCC1 of the first VGA interface 20, and grounded via the ground pin GND2 of the second VGA interface 30, the VGA cable 90 and the ground pin GND1 of the first VGA interface 20.

The connector 50 can be one of a personal system 2 (PS/2) mouse or keyboard connector and a universal serial bus (USB) mouse or keyboard connector. When the connector 50 is a PS/2 mouse or keyboard connector, the first connecting pin P3 of the connector 50 is a data pin used to transmit data signal, which corresponds with Pin 1 of a standard PS/2 mouse or keyboard connector pinout configuration. The second connecting pin P4 of the connector 50 is a clock pin used to transmit clock signal, which corresponds with Pin 5 of a standard PS/2 mouse or keyboard connector pinout configuration. The power source pin VCC of the connector 50 is in correspondence with Pin 4 of a standard PS/2 mouse of keyboard connector pinout configuration, and the ground pin GND of the connector 50 is in correspondence with Pin 3 of a standard PS/2 mouse of keyboard connector pinout configuration. Accordingly, the first control pin P1 and the second control pin P2 of the motherboard 10 are data pin and clock pin respectively. The motherboard 10 receives data signals from the PS/2 mouse or keyboard via the first control pin P1; and receives clock signals from the PS/2 mouse or keyboard via the second control pin P2.

When the connector 50 is a USB mouse or keyboard connector, the first connecting pin P3 of the connector 50 is a forward differential signal (D+) pin used to transmit forward differential signal which corresponds with Pin 3 of a standard USB mouse or keyboard connector pinout configuration. The second connecting pin P4 of the connector 50 is a reverse differential signal (D−) pin used to transmit reverse differential signal, which corresponds with Pin 2 of a standard USB mouse or keyboard connector pinout configuration. The power source pin VCC of the connector 50 is in correspondence with Pin 1 of a standard USB mouse or keyboard connector pinout configuration, and the ground pin GND of the connector 50 is in correspondence with Pin 4 of a standard USB mouse or keyboard connector pinout configuration. Accordingly, the first control pin P1 and the second control pin P2 of the motherboard 10 are forward differential signal pin and reverse differential signal pin respectively. The motherboard 10 receives forward differential signals from the USB mouse or keyboard via the first control pin P1; and receives reverse differential signals from the USB mouse or keyboard via the second control pin P2.

The interface device 100 further includes a first filter circuit 60, a second filter circuit 70 and a third filter circuit 80.

The first filter circuit 60 is used to reduce noise induced between the first pin X1 of the first VGA interface 20 and the first control pin P1 of the motherboard 10. The first filter circuit 60 includes a first inductor L1 and a first capacitor C1. The first inductor L1 is electronically connected between the first pin X1 of the first VGA interface 20 and the first control pin P1 of the motherboard 10. The first capacitor C1 is electronically connected between ground and a node between the first inductor L1 and the first pin X1 of the first VGA interface 20.

The second filter circuit 70 is used to reduce noise induced between the second pin X2 of the first VGA interface 20 and the second control pin P2 of the motherboard 10. The second filter circuit 70 includes a second inductor L2 and a second capacitor C2. The second inductor L2 is electronically connected between the second pin X2 of the first VGA interface 20 and the second control pin P2 of the motherboard 10. The second capacitor C2 is electronically connected between ground and a node between the second inductor L2 and the second pin X2 of the first VGA interface 20.

The third filter circuit 80 is used to reduce noise induced between the power source pin VCC1 of the first VGA interface 20 and the power source of the motherboard 10. The third filter circuit 80 includes a third inductor L3 and a third capacitor C3. The third inductor L3 is electronically connected between the power source pin VCC1 of the first VGA interface 20 and the power source of the motherboard 10. The third capacitor C3 is electronically connected between ground and a node between the third inductor L3 and the power source pin VCC1 of the first VGA interface 20.

The motherboard 10 electronically connects to the connector 50 to communicate with a mouse or a keyboard via the first VGA interface 20 and the second VGA interface 30. Since the connector 50 is positioned on the display 40, it is convenient for users to use the connector 50.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An interface device for input device, comprising:
a motherboard comprising a first control pin, a second control pin, and a power source;
a first video graphics array (VGA) interface electronically connected to the motherboard, the first VGA interface comprising a first pin electronically connected to the first control pin, a second pin electronically connected to the second control pin, a power source pin electrically connected to the power source, and a grounded ground pin;
a second VGA interface positioned on a display, the second VGA interface comprising a third pin, a fourth pin, a power source pin, and a ground pin;
a VGA cable electronically connecting the first pin, the second pin, the power source pin, and the ground pin of the first VGA interface with the third pin, the fourth pin, the power source pin, and the ground pin respectively of the second VGA interface; and
a connector positioned on the display, the connector comprising a first connecting pin, a second connecting pin, a power source pin and a ground pin electronically connected to the third pin, the fourth pin, the power source pin and the ground pin respectively of the second VGA interface, the connector mating with an input device such that the input device communicates with the motherboard via the connector, the second VGA interface, the VGA cable, and the first VGA interface.

2. The interface device for input device as claimed in claim 1, wherein the input device is a mouse or a keyboard.

3. The interface device for input device as claimed in claim 1, wherein the connector is a personal system 2 (PS/2) mouse or keyboard connector, the first control pin receives data signal from the mouse or keyboard via the first pin of the first VGA interface, the third pin of the second VGA interface and the first connecting pin of the connector; the second control pin receives clock signal from the mouse or keyboard via the second pin of the first VGA interface, the fourth pin of the second VGA interface and the second connecting pin of the connector.

4. The interface device for input device as claimed in claim 1, wherein the connector is a universal serial bus (USB) mouse or keyboard connector, the first control pin receives forward differential signal from the mouse or keyboard via the first pin of the first VGA interface, the third pin of the second VGA interface and the first connecting pin of the connector; the second control pin receives reverse differential signal from the mouse or keyboard via the second pin of the first VGA interface, the fourth pin of the second VGA interface and the second connecting pin of the connector.

5. The interface device for input device as claimed in claim 1, further comprising a first filter circuit used to reduce noise induced between the first pin of the first VGA interface and the first control pin of the main board, wherein the first filter circuit comprises a first inductor and a first capacitor, the first inductor is electronically connected between the first pin of the first VGA interface and the first control pin of the main board, the first capacitor is electronically connected between ground and a node between the first inductor and the first pin of the first VGA interface.

6. The interface device for input device as claimed in claim 1, further comprising a second filter circuit used to reduce noise induced between the second pin of the first VGA interface and the second control pin of the main board, wherein the second filter circuit comprises a second inductor and a second capacitor, the second inductor is electronically connected between the second pin of the first VGA interface and the second control pin of the main board, the second capacitor is electronically connected between ground and a node between the second inductor and the second pin of the first VGA interface.

7. The interface device for input device as claimed in claim 1, further comprising a third filter circuit used to reduce noise induced between the power source pin of the first VGA interface and the power source of the main board, wherein the third filter circuit comprises a third inductor and a third capacitor, the third inductor is electronically connected between the power source pin of the first VGA interface and the power source of the main board, the third capacitor is electronically connected between ground and a node between the third inductor and the power source pin of the first VGA interface.

* * * * *